Patented June 6, 1944

2,350,446

UNITED STATES PATENT OFFICE 2,350,446

PRODUCTION OF AMINOPYRANS

Thomas F. Carruthers, South Charleston, and Robert W. Kiefer, Charleston, W. Va., assignors to Carbide and Carbon Chemicals Corporation, a corporation of New York No Drawing. Application March 25, 1942,
Serial No. 436,096

11 Claims. (Cl. 260—333)

This invention relates to the production of amino compounds of the type represented by the general formula:

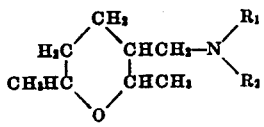

wherein $R_1$ and $R_2$, respectively, may be either hydrogen, alkyl, aryl or aralkyl groups, or additional 2,6 - dimethyl tetrahydropyranomethyl groups.

More especially the invention concerns the production of such amino compounds from the dimer of crotonaldehyde. This dimer is commonly formed as a by-product in connection with processes for the manufacture of crotonaldehyde by the condensation of acetaldehyde in the presence of a caustic alkali condensing agent, followed by the catalytic dehydration of the resultant aldol to form crotonaldehyde. Processes of this type are now well known, and are exemplified in the respective United States Patent 1,598,522 of C. J. Herrly and United States Patent 1,587,661 of F. W. Lommen.

Upon distilling the reaction products resulting from the aforesaid catalytic dehydration of the aldol, high boiling oily liquids tend to accumulate and are commonly referred to as "crotonaldehyde oils." Prior to the present invention such residues have represented a substantial loss of potentially valuable chemical energy because of their chemical complexity. It has now been found that these residues contain, as the main constituent, 2,6-dimethyl-5,6-dihydro-3-formylpyran, together with substantial amounts of vinyl crotonaldehyde, n-hexadienal, n-octatrienal and other materials.

In accordance with one form of the present invention, the unsaturated 2,6-dimethyl-5,6-dihydro-3-formylpyran,—or the "crotonaldehyde oil" or other reaction mixture containing the same—is converted to the corresponding saturated aldehyde compound by hydrogenation, either in the vapor phase or liquid phase, with hydrogen in the presence of a suitable hydrogenation catalyst, such as nickel, preferably at temperatures ranging between around 20° C. and 300° C. If desired the "crotonaldehyde oil" may be fractionated, prior to the hydrogenation, to secure a fraction relatively rich in the aforesaid dimethyl dihydroformylpyran.

A nickel catalyst composed of a nickel made from a nickel-aluminum alloy, such as the catalyst described in the United States Patent 1,628,190 of M. Raney, is particularly suitable. The hydrogenation is so conducted that the reactive aldehyde group is unaffected, but the unsaturation in the cyclic nucleus is eliminated, yielding a saturated aldehyde which has the structure corresponding to the formula

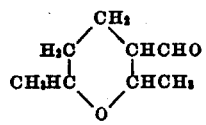

and may be designated as 2,6-dimethyl tetrahydro-3-formylpyran. It boils at 67° C., under an absolute pressure of 10 mm. of mercury; and has a specific gravity at 20°/20° C. of 0.9870.

To illustrate one method of making the saturated aldehyde—a quantity of the 2,6-dimethyl dihydro-3-formylpyran was placed in a steel bomb with 2.5% of nickel made from a nickel-aluminum alloy, and was subjected to the action of hydrogen at 65° C., and under pressures ranging between 600 and 900 pounds per square inch for 6 hours. The mixture was cooled, filtered, and the filtrate distilled under vacuum. The fraction distilling between 65° C. and 68° C. under an absolute pressure of 8 mm. of mercury consisted of the aforesaid saturated dimethyl aldehydopyran derivative. The latter was then employed as starting material for the production of the amines of the present invention.

The saturated pyran derivative from this hydrogenation is then reacted, preferably under anhydrous conditions, with ammonia or with a primary or secondary aliphatic, aromatic or mixed amine, such as ethylamine, phenylamine, diphenylamine and benzylamine, preferably in the anhydrous form.

After removal of water formed in this reaction, the residue, containing the unsaturated intermediate pyran derivative, is hydrogenated—preferably at a temperature within the range between around 125° C. and around 200° C., and under a pressure of at least several hundred pounds per square inch. Pressures ranging upwardly of 2500 pounds per square inch or more can be used advantageously. The amines are recovered from the resultant reaction mixture in suitable manner, as hereinafter described. The hydrogenation may be conducted in the presence of anhydrous ammonia or of one or more of the aforesaid amines, preferably in the presence of an inert mutual solvent for the reactants, such as dioxane.

The amines of the invention may also be produced, though less effectively, by reacting the ammonia or amine directly with the unsaturated 2,6-dimethyl-5,6-dihydro-3-formylpyran, removing the water so formed, and subjecting the product to hydrogenation, which will then serve to saturate both the cyclic nucleus and the reactive group in the side chain.

The following examples will serve to illustrate the invention:

Example 1

Anhydrous ammonia was passed into 610 grams of the 2,6-dimethyl tetrahydro-3-formylpyran, produced in the manner described above, until it was saturated with ammonia, while maintaining the mixture at a temperature within the range between around 20° C. and around 40° C. A water layer separated from the reaction mixture upon standing, and was withdrawn. The residue was charged into a pressure bomb with 12 grams of "Raney" nickel catalyst of the type hereinbefore described, 76 grams of anhydrous ammonia and 200 cc. of dioxane, the latter serving as a mutual solvent. The bomb and its contents were shaken and heated to 150° C. during a period of 1 hour. The mixture then was reacted for 4 hours with hydrogen under pressure while maintaining the mixture at a temperature within the range between 150° C. and 176° C., and under a maximum pressure of 1460 pounds per square inch, gauge. The reaction mixture, after filtering off the nickel catalyst, was distilled under subatmospheric pressure. The fraction boiling at 87° C. under an absolute pressure of 20 mm. of mercury was a primary amine which may be designated 2,6-dimethyl tetrahydro-3-pyranomethylamine, and apparently has the structure indicated by the formula

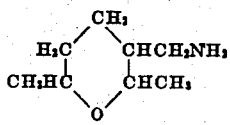

It is a water white liquid having an ammoniacal odor; and is completely soluble in water, gasoline and mineral oils. It has a specific gravity at 20°/20° C. of 0.9347. A yield of around 70% of this primary amine, based upon the saturated aldehyde starting material, was secured.

Example 2

Following the procedure recited in Example 1, but substituting for the saturated dimethyl tetrahydro-3-formylpyran the corresponding unsaturated aldehyde, 2,6-dimethyl-5,6-dihydro-3-formylpyran recovered from "crotonaldehyde oil," a good yield of the primary amine described in Example 1 was secured; although the yield of amine was much less than that obtained when employing the saturated aldehydopyran. This is apparently due to uncontrolled side reactions of the unsaturated compounds present, which result in the formation of a hard resinous material.

Example 3

Anhydrous ammonia was passed through 800 grams of 2,6-dimethyl tetrahydro-3-formylpyran until the latter was saturated with ammonia at temperatures of around 10° C. to 20° C. The water formed in the reaction caused the formation of a separate phase, which was distilled off by gentle warming of the reaction mixture and reduction of the pressure until the product was homogeneous. The resultant dry product was hydrogenated, in the presence of 2.5% of its weight of a "Raney" nickel catalyst. The hydrogenation was conducted at elevated temperatures within the range up to around 200° C., and under superatmospheric pressure, a maximum pressure of 2200 pounds per square inch, gauge, being used. The resultant reaction mixture then was distilled under vacuum, yielding 125 grams of the primary amine, 2,6-dimethyl tetrahydro-3-pyranomethylamine, boiling at 87° C., under an absolute pressure of 20 mm. of mercury; and 473 grams of the secondary amine in the form of a water white, viscous, water-insoluble liquid of mild odor, boiling at about 132° C. under an absolute pressure of 2.5 mm. of mercury, and having a specific gravity at 20°/20° C. of 0.961. This secondary amine may be designated as di(2,6-dimethyl tetrahydro-3-pyranomethyl) amine, and apparently has a structure corresponding to the formula

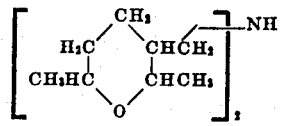

The corresponding tertiary amine may be derived from the corresponding primary and secondary amine by conventional methods. For example, the secondary amine may be reacted with an aldehyde such as acetaldehyde; or a ketone such as acetone; and the resultant reaction product then hydrogenated under pressure in the presence of a nickel hydrogenation catalyst.

If desired, the secondary amine may be reacted with an alkyl sulfate such as diethyl sulfate, or with an alkyl chloride such as ethyl chloride, for production of the tertiary amine. The primary amine may be used in place of the secondary amine in the aforesaid reactions.

The tertiary amine also may be produced by condensing the unsaturated aldehydopyran, 2,6-dimethyl-5,6-dihydro-3-formylpyran, with a secondary amine of the type R₁NHR₂, wherein $R_1$ and $R_2$, respectively, may be either an alkyl radical, an aryl radical, an aralkyl radical or a 2,6-dimethyl tetrahydropyranomethyl radical. The condensation of the unsaturated aldehyde and the amino compound may be conveniently effected at temperatures within the range between 40° C. and 100° C. After removal of the water from the reaction mixture, the latter may be hydrogenated at a temperature within the range from 125° C. to 200° C., while under superatmospheric pressure, in the presence of a "Raney" nickel catalyst, thereby yielding the tertiary amine.

The amine derivatives of the invention have properties adapting them for use for a wide variety of purposes such, for example, as in the stabilization of gasoline and motor oils against gum formation; as corrosion inhibitors for hydrocarbon oils, water-oil emulsions, chlorinated solvents, aqueous anti-freeze solutions and the like; and as intermediates in the preparation of various organic compounds, and of wetting agents and detergents. They also have been found to be very effective fungicidal agents.

We claim:

1. As new compounds, amines containing at least one 2,6-dimethyl tetrahydropyranomethyl group in the molecule, and having chemical structures apparently represented by the formula

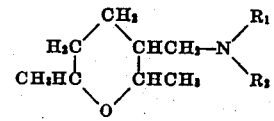

wherein $R_1$ and $R_2$, respectively, may designate the same or a different member of the class consisting of hydrogen, the alkyl groups, the aryl groups, the aralkyl groups, and the 2,6-dimethyl tetrahydropyranomethyl group.

2. As a new compound, 2,6-dimethyl tetrahydro-3-pyranomethylamine, the same being a liquid having an ammoniacal odor and completely soluble in water, gasoline and mineral oils, and having a specific gravity at 20°/20° C. of 0.9347.

3. As a new compound, di(2,6-dimethyl tetrahydro-3-pyranomethyl) amine, the same being a viscous, water-insoluble liquid boiling at about 132° C. under an absolute pressure of 2.5 mm. of mercury, and having a specific gravity at 20°/20° C. of 0.961.

4. Process of producing an amine having at least one 2,6-dimethyl tetrahydro-3-pyranomethyl group in the molecule, which comprises reacting 2,6-dimethyl tetrahydro-3-formylpyran with a compound corresponding to the formula

wherein $R_1$ is hydrogen, and $R_2$, and $R_3$, respectively, are selected from the group consisting of hydrogen, alkyl, aryl and aralkyl radicals, hydrogenating the resultant reaction mixture in the presence of a hydrogenation catalyst, and recovering from the hydrogenation reaction mixture the dimethyl tetrahydro-3-pyranomethylamine thus produced.

5. Process of producing an amine having at least one 2,6-dimethyl tetrahydro-3-pyranomethyl group in the molecule, which comprises reacting 2,6-dimethyl tetrahydro-3-formylpyran with a compound corresponding to the formula

wherein $R_1$ is hydrogen, and $R_2$, and $R_3$, respectively, are selected from the group consisting of hydrogen, alkyl, aryl and aralkyl radicals, hydrogenating the resultant reaction mixture in the presence of a hydrogenation catalyst under superatmospheric pressure and at a temperature within the range between around 125° C. and 200° C., and recovering from the resultant hydrogenation reaction mixture the 2,6-dimethyl tetrahydro-3-pyranomethylamine thus produced.

6. Process of making an amine having at least one 2,6-dimethyl tetrahydro-3-pyranomethyl group in the molecule, which comprises condensing 2,6-dimethyl tetrahydro-3-formylpyran with anhydrous ammonia, removing the water thus formed, hydrogenating the reaction mixture under superatmospheric pressure at an elevated temperature in the presence of a hydrogenation catalyst, and recovering from the hydrogenation reaction mixture the 2,6-dimethyl tetrahydro-3-pyranomethylamine thus produced.

7. Process of making an amine having at least one 2,6-dimethyl tetrahydro-3-pyranomethyl group in the molecule, which comprises condensing 2,6-dimethyl tetrahydro-3-formylpyran with anhydrous ammonia at a temperature within the range between around 10° C. and 50° C., removing the water formed in the reaction, hydrogenating the resultant reaction mixture under superatmospheric pressure at an elevated temperature not substantially higher than 200° C. in the presence of a nickel hydrogenation catalyst, and recovering from the hydrogenation reaction mixture the 2,6-dimethyl tetrahydro-3-pyranomethylamine thus produced.

8. Process of making an amine having at least one 2,6-dimethyl tetrahydro-3-pyranomethyl group in the molecule, which comprises condensing 2,6-dimethyl tetrahydro-3-formylpyran with anhydrous ammonia, removing the water thus formed, hydrogenating the reaction mixture under superatmospheric pressure at an elevated temperature in the presence of a hydrogenation catalyst, isolating from the hydrogenation reaction mixture the 2,6-dimethyl tetrahydro-3-pyranomethylamine thus produced, and converting the latter to a tertiary amine.

9. Process for making an amine having at least one 2,6-dimethyl tetrahydro-3-pyranomethyl group in the molecule, which comprises condensing 2,6-dimethyl tetrahydro-3-formylpyran with an anhydrous secondary amine at a temperature within the range between around 40° C. and around 100° C., removing the water thus formed, hydrogenating the reaction mixture under superatmospheric pressure at an elevated temperature not substantially higher than 200° C., in the presence of a hydrogenation catalyst, and recovering from the hydrogenation reaction mixture the tertiary amine thus produced.

10. Process for making an amine having at least one 2,6-dimethyl tetrahydro-3-pyranomethyl group in the molecule, which comprises condensing 2,6-dimethyl tetrahydro-3-formylpyran with an anhydrous compound corresponding to the formula

wherein $R_1$ is hydrogen, and $R_2$, and $R_3$, respectively, are selected from the group consisting of hydrogen, alkyl radicals, aryl radicals and aralkyl radicals, removing the water thus formed, hydrogenating the reaction mixture under superatmospheric pressure at an elevated temperature in the presence of a hydrogenation catalyst, condensing the 2,6-dimethyl tetrahydro-3-pyranomethylamine present in the hydrogenation reaction mixture with a compound selected from the group consisting of the aliphatic and the aromatic aldehydes and ketones, hydrogenating the resultant reaction mixture at an elevated temperature in the presence of a hydrogenation catalyst, and recovering from the hydrogenation products the tertiary amine thus produced.

11. Process for producing an amine having at least one 2,6-dimethyl tetrahydro-3-pyranomethyl group in the molecule, which comprises reacting a compound selected from the group consisting of 2,6-dimethyl 5,6-dihydro-3-formylpyran and 2,6-dimethyl tetrahydro-3-formylpyran with a compound corresponding to the formula

wherein $R_1$ is hydrogen, and $R_2$ and $R_3$, respectively, are selected from the group consisting of hydrogen, alkyl, aryl and aralkyl radicals, and the 2,6-dimethyl tetrahydro-3-pyranomethyl radical, hydrogenating the resultant reaction mixture in the presence of a hydrogenation catalyst, and recovering from the hydrogenation reaction mixture the resultant amine having at least one 2,6-dimethyl tetrahydro-3-pyranomethyl group in the molecule.

THOMAS F. CARRUTHERS.
ROBERT W. KIEFER.